(12) United States Patent
Weagle

(10) Patent No.: US 8,979,685 B2
(45) Date of Patent: Mar. 17, 2015

(54) IMPACT PROTECTOR MOUNTING

(75) Inventor: David Weagle, Edgartown, MA (US)

(73) Assignee: The Hive Global, Inc., Petaluma, CA (US)

( * ) Notice: Subject to any disclaimer, the term of this patent is extended or adjusted under 35 U.S.C. 154(b) by 0 days.

(21) Appl. No.: 11/640,821

(22) Filed: Dec. 18, 2006

(65) Prior Publication Data

US 2007/0235986 A1    Oct. 11, 2007

Related U.S. Application Data

(60) Provisional application No. 60/790,210, filed on Apr. 7, 2006.

(51) Int. Cl.
    *B62J 13/00* (2006.01)
    *B62J 23/00* (2006.01)

(52) U.S. Cl.
    CPC . *B62J 13/00* (2013.01); *B62J 23/00* (2013.01)
    USPC .......................................................... 474/144

(58) Field of Classification Search
    USPC .......................................... 474/144, 146, 147
    See application file for complete search history.

(56) References Cited

U.S. PATENT DOCUMENTS

| | | | |
|---|---|---|---|
| 1,325,206 A | 12/1919 | Raybon | |
| 1,400,131 A | 12/1921 | Adams | |
| 1,636,327 A * | 7/1927 | Roe ............................. | 474/144 |
| 3,184,993 A | 5/1965 | Swenson | |
| D208,683 S | 9/1967 | Schreckengost | |
| 3,416,385 A | 12/1968 | Schenk | |
| 3,477,303 A | 11/1969 | Brilando | |
| 3,785,219 A | 1/1974 | Anthamatten | |
| 3,815,439 A | 6/1974 | Tarutani | |
| 3,869,138 A | 3/1975 | Allison | |
| 3,910,136 A | 10/1975 | Juy | |
| 3,973,447 A | 8/1976 | Nagano | |
| 4,044,621 A | 8/1977 | McGregor, Sr. | |
| 4,078,444 A | 3/1978 | Huret | |
| 4,106,357 A | 8/1978 | Segawa | |
| 4,135,727 A | 1/1979 | Campagnolo | |
| 4,237,743 A | 12/1980 | Nagano | |
| 4,240,303 A | 12/1980 | Mosley | |
| 4,330,137 A | 5/1982 | Nagano | |
| 4,337,933 A | 7/1982 | Egami | |
| 4,433,963 A | 2/1984 | Shimano | |
| 4,439,172 A | 3/1984 | Segawa | |
| 4,475,894 A | 10/1984 | Sugino | |
| 4,487,424 A | 12/1984 | Ellis | |

(Continued)

OTHER PUBLICATIONS

Mountain Bike Action Magazine, Oct. 2000, pp. 38-40, www.mbaction.com.

(Continued)

*Primary Examiner* — Thomas Irvin
(74) *Attorney, Agent, or Firm* — Haverstock & Owens LLP

(57) ABSTRACT

The current invention relates to impact protector mountings and methods of using such mountings for parts or structures that are susceptible to impact or the forces of an impact. Protectors of the invention are useful to protect any parts or structures in vehicles, including bicycles, motorcycles, cars, trucks, off-road vehicles, utility vehicles, and other vehicles. Impact protector mountings of the invention can be used to protect any parts and structures, including sprockets, disc brake rotors, engine parts, bottom brackets, drivetrain components, and other components susceptible to impact damage.

7 Claims, 4 Drawing Sheets

(56) References Cited

U.S. PATENT DOCUMENTS

| | | | |
|---|---|---|---|
| 4,498,890 A | 2/1985 | Sutherland | |
| 4,507,105 A | 3/1985 | Stottmann | |
| 4,515,386 A | 5/1985 | Tsujimura | |
| 4,573,950 A | 3/1986 | Nagano | |
| 4,632,416 A | 12/1986 | Zelenetz | |
| 4,639,240 A | 1/1987 | Liu | |
| 4,662,862 A | 5/1987 | Matson | |
| D298,613 S | 11/1988 | McMurtrey | |
| 4,832,667 A | 5/1989 | Wren | |
| 4,854,924 A | 8/1989 | Nagano | |
| 4,905,541 A | 3/1990 | Alan | |
| 5,002,520 A | 3/1991 | Greenlaw | |
| 5,018,564 A | 5/1991 | Anglin | |
| 5,067,930 A | 11/1991 | Morales | |
| D323,309 S | 1/1992 | Perry | |
| 5,121,935 A * | 6/1992 | Mathieu et al. | 280/152.3 |
| 5,320,582 A | 6/1994 | Takeda | |
| 5,326,331 A | 7/1994 | Hallock, III | |
| D355,872 S | 2/1995 | Haney | |
| 5,460,576 A | 10/1995 | Barnett | |
| 5,496,222 A | 3/1996 | Kojima | |
| 5,540,118 A | 7/1996 | Calendrille, Jr. | |
| 5,620,384 A | 4/1997 | Kojima | |
| 5,676,616 A | 10/1997 | Hara | |
| 5,679,084 A | 10/1997 | Daniels, III | |
| 5,725,450 A | 3/1998 | Huskey | |
| 5,728,018 A | 3/1998 | Terada | |
| 5,782,714 A | 7/1998 | Osgood | |
| 5,846,148 A | 12/1998 | Fujii | |
| 6,039,665 A | 3/2000 | Nakamura | |
| 6,060,982 A * | 5/2000 | Holtrop | 340/432 |
| 6,083,132 A | 7/2000 | Walker | |
| 6,117,032 A | 9/2000 | Nankou | |
| 6,165,092 A | 12/2000 | Bramham | |
| 6,203,459 B1 | 3/2001 | Calendrille, Jr. | |
| 6,332,853 B1 | 12/2001 | Bowman | |
| 6,354,973 B1 | 3/2002 | Barnett | |
| 6,416,434 B1 | 7/2002 | Calendrille, Jr. | |
| 6,533,690 B2 | 3/2003 | Barnett | |
| 6,988,427 B2 | 1/2006 | Yamanaka | |
| 7,059,983 B2 | 6/2006 | Heim | |
| 7,066,856 B1 | 6/2006 | Rogers | |
| 7,066,857 B1 | 6/2006 | DeRosa | |
| 7,886,947 B2 * | 2/2011 | Campagnolo | 224/414 |
| 8,235,849 B2 * | 8/2012 | Cranston et al. | 474/144 |
| 8,491,429 B2 * | 7/2013 | Cranston et al. | 474/144 |
| 2002/0160869 A1 | 10/2002 | Barnett | |
| 2004/0009835 A1 | 1/2004 | Heim | |
| 2004/0254038 A1 | 12/2004 | Chamberlain | |
| 2006/0199690 A1 | 9/2006 | Gardner | |
| 2013/0053195 A1* | 2/2013 | Emura et al. | 474/140 |
| 2013/0053196 A1* | 2/2013 | Emura et al. | 474/140 |

OTHER PUBLICATIONS

2001 Gizmo Installation Instructions, web.archive.org/web/20011025172447/http://mrdirt.com/gizmo/page4.htm.

* cited by examiner section A-A

IMPACT PROTECTOR MOUNTING

This application claims the benefit of U.S. Provisional Application No. 60/790,210, filed Apr. 7, 2006, which is incorporated herein by reference.

1.0 FIELD OF THE INVENTION

The current invention relates to mounting of protectors for parts or structures that are susceptible to impact or the forces of an impact. Impact protector mountings of the invention are useful to protect any parts or structures, especially parts and structures found in vehicles, including bicycles. Impact protector mountings of the invention can provide mountings for impact protectors to protect any parts and structures, including sprockets, frame parts, shock absorbers, and other components susceptible to impact damage.

2.0 BACKGROUND

Parts and structures of objects, in particular moving objects like vehicles of any kind, can be subject to stress caused by an impact. The stress or force of an impact can cause damage to parts and structures, either directly or indirectly, and lessening or avoiding such damage can be desirable. Examples of applications where parts and structures may be subject to impact forces include vehicles of any kind, for example, land vehicles, water going vehicles, under-water vehicles, air vehicles and space vehicles. Other examples are parts and structures in industrial applications, manufacturing applications, household applications, farming applications, and any other application where added protection against impact forces is desired. Specific examples of parts and structures that may suffer under impact forces, and that may benefit from a protector, are sprockets used in vehicles, including on bicycles, motorcycles, and ATVs. Protecting sprockets can pose a challenge. Problems may arise where an impact may lead to bending and deformation or to movement of mounting components under impact. A specific concern pertains to bicycle sprocket protection, where an impact protector is mounted to a bicycle crank arm, substantially coaxially with a sprocket or cluster of sprockets. The bicycle crank arm is designed to transfer force from the rider's legs to the sprockets and from the sprockets to the driving wheel. Impact at an impact protector for bicycle sprockets can typically bend the crank arm, which then requires replacement. Other problems may arise from the manner in which a protector is attached or mounted to protect certain parts or structures. For example, impact protector mountings are less desirable if they transmit excessive impact forces onto parts that are not designed to withstand such forces. For example, bicycle impact protectors that are mounted by merely clamping the protector to a frame using a bicycle bottom bracket as a single bolted connection may result in damage to a bottom bracket or bicycle drivetrain component under impact. Examples of such protectors are shown in U.S. Pat. No. 7,066,856. Bicycle bottom brackets thread into bicycle frames to provide a rotational mounting for bicycle crank arms. Bicycle bottom brackets are not well suited to mitigate significant impact forces. An impact on a bottom bracket can damage the bottom bracket, possibly causing an unsafe operating condition for the rider. Another concern in the design of impact protectors are movements of the impact protector in case of an impact. For example, impact protector designs that clamp between the bottom bracket and bicycle frame can rotate during impact and thereby expose components they were aimed to protect against impact forces. Yet another consideration in designing impact protectors are the means by which the protector is attached. For example, where screws are used to gouge the impact protector into the bicycle frame, dangerous frame damage from the points of the screws may result. Also, elaborate and heavy clamping mechanisms are not ideal due to the extremely large number of frame design variations and layouts. Additionally, due to the lightweight nature of bicycle frame designs and the reliance on thin walled tubing, clamp type designs such as disclosed in U.S. Pat. Nos. 5,067,930 and 7,066,856 can cause structural damage by crushing thin walled tubes during clamping. Further challenges arise for bicycle impact protector mountings when considering the need for chainguides on bicycles. Many bicycles used for downhill and aggressive type riding include devices known as chain guides or chain retention systems to prevent derailment of a chain on a front sprocket or sprockets of a bicycle. Typically these devices incorporate an outer and inner impact protector mounted to the bicycle crank arm. Some designs use an outer impact protector that is mounted to a bicycle crank arm, in conjunction with an inner impact protector that is an integrated part of an inner chain guide plate. These designs frequently pose problems when the inner protector deforms due to impact and causes binding in, or damage to, the bicycle drivetrain.

There is a need for impact protector mountings that can minimize damage to mounting components, bicycle crank arms, bottom brackets, frames, or other parts. A need also exists for mountings that can maintain the location of the protector in relation to parts that are to be protected. A need further exists for mountings that are sufficiently light in weight. Furthermore, a need exists for impact protector mountings that integrate with bicycle chainguides while minimizing damage to bicycle crank arms, bottom brackets, frames, or other parts. Finally, a need exists for protector mountings that are more cost effective. The present invention provides impact protector mountings that satisfy one or more of these needs.

3.0 SUMMARY OF THE INVENTION

The current invention relates to impact protector mountings and mounting methods to protect parts and structures from forces, in particular impact forces. Impact protector mountings and mounting methods of the current invention are useful for vehicles of all kinds, including land vehicles, water vehicles, under-water vehicles, air vehicles, and space vehicles. Impact protector mountings of the current invention are especially useful for bicycles or other vehicles that use drivetrain components that can benefit from impact from protection. In certain embodiments, an impact protector mounting of the current invention comprises structures, designs, or arrangements that locate an impact protector in relation to a sprocket. In certain other embodiments, an impact protector mounting of the current invention locates an impact protector at a location inboard of a sprocket or sprockets. In certain other embodiments, an impact protector mounting of the invention shares components with a chain guide or chain retention system. In certain other embodiments, an impact protector mounting of the current invention separates an impact protector component from a chain guide component. In certain other embodiments, an impact protector mounting of the invention directs impact force from an impact protector to a frame structure without intermediately transferring force through a drivetrain component such as a bottom bracket or crank arm. In certain other embodiments, an impact protector mounting of the invention uses multiple connections to locate an impact protector to a frame structure.

In certain other embodiments, these connections are bolted connections. In certain other embodiments, an impact protector mounting of the invention uses multiple connections to locate an impact protector to a mounting plate which uses multiple connections to locate to a frame structure. In certain other embodiments, these connections are bolted connections. In certain other embodiments, these locations are splined connections. In certain other embodiments, a connection adapter can be a removable component that can be replaced if damaged. Multiple designs are shown to meet the requirements included as well as different aesthetic needs and manufacturing costs.

4.0 BRIEF DESCRIPTION OF THE DRAWINGS

FIG. 2a shows a close up cutaway three-dimensional view example of an embodiment of the present invention as shown in FIG. 1a.

5.0 DETAILED DESCRIPTION

Figure 1A:
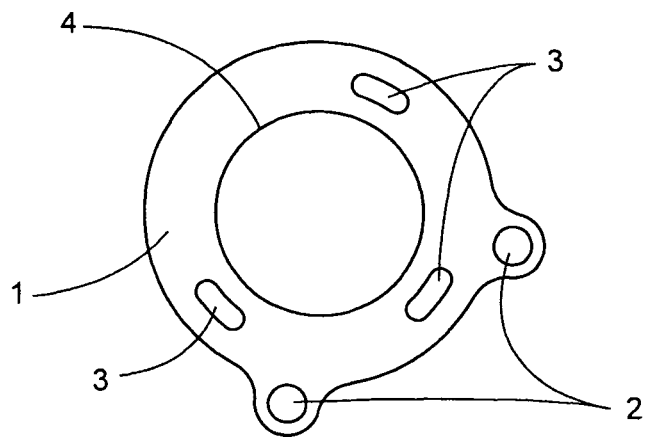
FIG. 1a illustrates a side view of an impact protector mounting plate used in certain embodiments of the current invention.

The current invention relates to impact protector mountings and methods for mounting impact protectors. Methods of the current invention, in certain embodiments, comprise mounting an impact protector using an impact protector mounting according to the invention. An impact protector mounting of the invention, under certain embodiments, facilitates the absorption of impact forces. In certain preferred embodiments, an impact protector mounting of the invention transmits force from an impact protector to a frame structure. In certain other preferred embodiments, an impact protector mounting of the invention directs impact force from an impact protector to a frame structure without intermediately transferring force through a drivetrain component such as a bottom bracket, axle, axle bearings, or crank arm. In certain preferred embodiments, an impact protector mounting of the invention uses multiple connections to locate an impact protector to a frame structure. In certain other preferred embodiments, these connections are bolted connections. In certain preferred embodiments, an impact protector mounting of the invention uses multiple connections to locate an impact protector to a mounting plate which uses multiple connections to locate to a frame structure. In certain other preferred embodiments, these connections are bolted connections. In certain other preferred embodiments, these connections are splined connections. In certain preferred embodiments a mounting plate is attached to a frame structure without contact to a drivetrain component. In certain preferred embodiments, a mounting plate is located to a frame structure via mounting plate location features where said mounting plate does not directly contact a drivetrain component. In certain preferred embodiments, a mounting plate is designed to prevent deformation of a mounting plate under impact. Because impacts can be significant, in certain embodiments, protection of a bottom bracket or drivetrain component is necessary. In certain preferred embodiments, impact force is transmitted into a frame structure via a fastened connection. In certain preferred embodiments, mounting tabs comprise mechanical features used to accept mounting plate fasteners so as to locate a mounting plate to a frame structure. In certain other embodiments, a deformable adapter can be a removable part that can be replaced if damaged. In certain other embodiments, a deformable adapter can be located to a frame structure via a bolted and or splined connection. In certain embodiments, use of a deformable adapter can be advantageous where mounting plate location features are not present and where fragile existing drivetrain components such as a bottom bracket are present. In certain embodiments, a deformable adapter can take the place of or be positioned next to a bottom bracket spacer. In certain embodiments, a deformable adapter can be bolted to a frame member via a bottom bracket, where a bottom bracket flange positions a deformable adapter in relation to a frame structure. In certain embodiments, a deformable adapter can comprise mounting tabs and a deformable structure. In certain embodiments, a deformable adapter can be used to position a mounting plate while at the same time protecting a bottom bracket from impact. In certain embodiments, a deformable adapter can bend or otherwise deform so as to absorb impact force that could otherwise be transferred to a bottom bracket and cause damage to said bottom bracket. In particularly preferred embodiments, an impact protector mounting of the invention shares components with a bicycle chain guide or chain retention system. This allows the impact protector mounting, in certain embodiments, to be mounted in close proximity to mechanical components, for example, axles, sprockets, chain guide parts, and crank arms. Some embodiments of the invention can be designed to share mounting locations with other components, or act as a mounting component for additional components such as chain guide sliders, rollers, idlers, or guides. In certain embodiments, an impact protector mounting of the current invention separates an impact protector component from a chain guide component so as to reduce the effect of impact at an impact protector on chain guiding performance. In certain embodiments, an impact protector mounting of the current invention combines an impact protector component with a chain guide component so as to reduce cost of the system. In certain other embodiments, a chain guide feature and impact protector feature could be a single manufactured part with specific features so as to lessen the effect of impact at an impact protector on chain guiding performance. In certain embodiments, a chain guide feature could have a different distance from a bicycle chainring as an impact protecting feature so as to keep a chain guide feature closer to a sprocket, and an impact protector feature further away from a sprocket. In some embodiments, an impact protector and a mounting plate could be a multiple manufactured units. In some embodiments, an impact protector, a mounting plate, and a chain guide feature could be multiple manufactured parts. In some embodiments, an impact protector and a mounting plate could be a single manufactured unit. In some embodiments, an impact protector, a mounting plate, and a chain guide feature could be a single manufactured part. Some of the many applications where shared mounting of an impact protector and an existing component could be useful would be bicycle, motorcycle, and machinery sprockets, sprocket clusters, and disc brake rotors. Some embodiments of the invention can be designed to act as a dedicated impact protector mounting component. Some of the many applications where dedicated mounting components could be useful are protectors for motorcycle crank cases, transmissions and engines, bicycle, motorcycle, and machinery sprockets, sprocket clusters, and disc brake rotors, and gearboxes for gardening, earthmoving, and snow removal equipment. Some embodiments of the invention locate an impact protector in a fixedly next to moving or rotating components that it protects.

The drawings use the following numbers and terms: mounting plate (1); impact protector location feature (2); mounting plate location feature (3); drivetrain clearance hole (4); chain guide part location feature (5) chain guide part mounting arm (6); frame structure (7); bottom bracket (8); bottom bracket flange (9); bottom bracket spindle (10); mounting tab (11); impact protector (12); mounting plate fastener (13); impact protector fastener (14); section line A-A (15); bottom bracket spacer (16)

The terms used to define components within this disclosure will be discussed as singular and plural terms.

FIG. 1a presents a design for an impact protector locating mounting plate according to certain embodiments of the current invention via a two-dimensional side view. Shown in FIG. 1a are the following: mounting plate (1); impact protector location feature (2); mounting plate location feature (3); drivetrain clearance hole (4).

A mounting plate 1 as shown in FIG. 1a could be attached to a frame structure via mounting plate location features 3. An impact protector can be located to the mounting plate 1 via impact protector location features 2. An impact protector mounting as shown in FIG. 1a is suited for, but not limited to, use to locate an impact protector where the mounting plate 1 locates to a frame structure using multiple mounting plate location features 3.

Figure 1B:
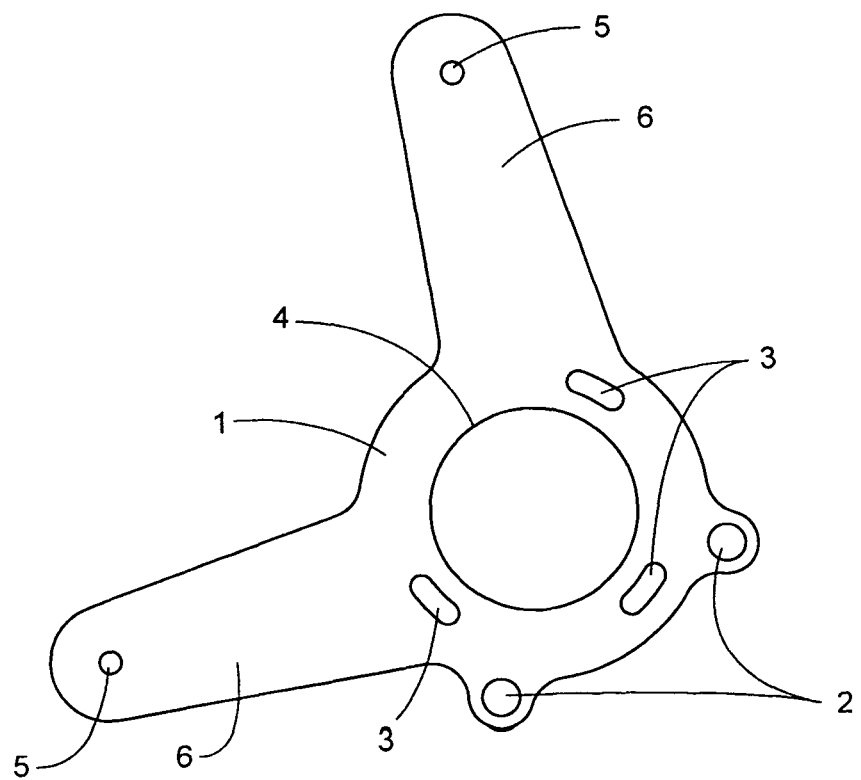
FIG. 1b illustrates a side view of an impact protector mounting plate used in certain embodiments of the current invention and which can share mounting locations with other components.

FIG. 1b presents a design for an impact protector locating mounting plate according to certain embodiments of the current invention via a two-dimensional side view. Shown in FIG. 1b are the following: mounting plate (1); impact protector location feature (2); mounting plate location feature (3); drivetrain clearance hole (4); chain guide part location feature (5); chain guide part mounting arm (6).

A mounting plate 1 as shown in FIG. 1b could be attached to a frame structure via mounting plate location features 3. An impact protector can be located to the mounting plate 1 via impact protector location features 2. An impact protector mounting as shown in FIG. 1b can be designed to share mounting locations with other components, or act as a mounting component for additional components such as chain guide sliders, rollers, idlers, or guides. Chain guide part locating features 5 are illustrated in FIG. 1b, and are supported by chainguide part mounting arms 6. An impact protector mounting as shown in FIG. 1b is suited for, but not limited to, use to locate an impact protector and chain guide parts where the mounting plate 1 locates to a frame structure using multiple mounting plate location features 3.

Figure 2A:
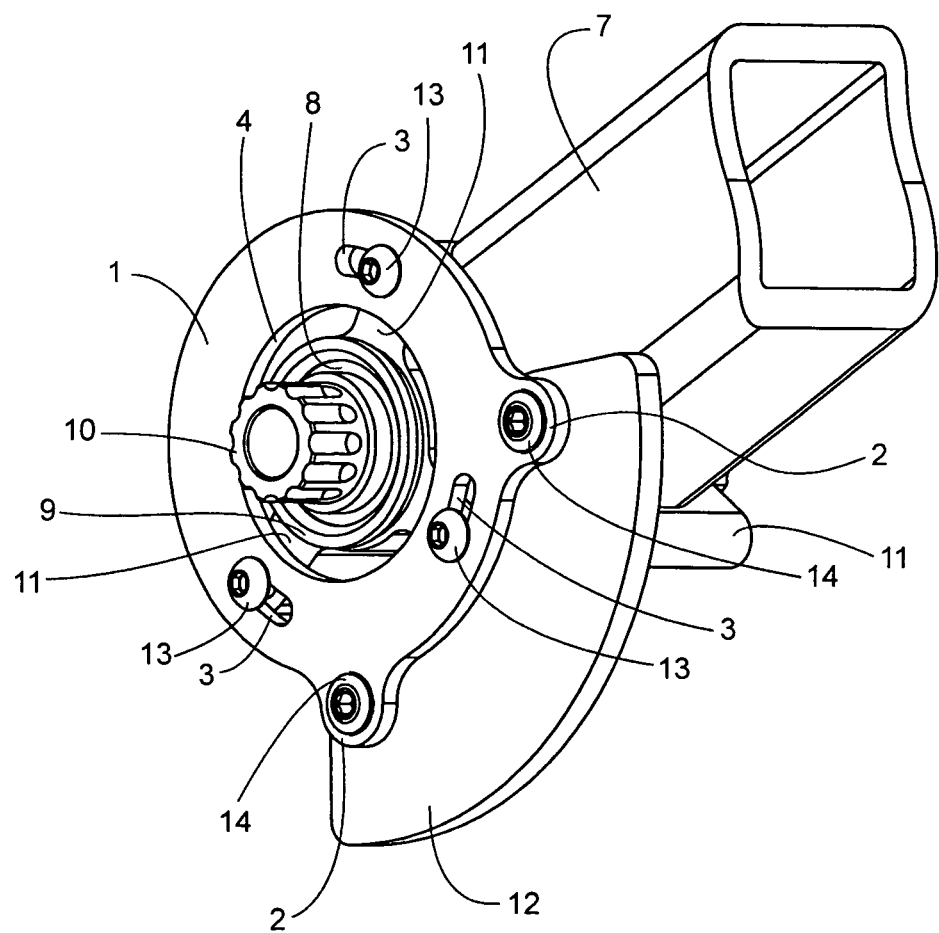

FIG. 2a shows a three-dimensional view of elements that comprise an impact protector mounting according to certain embodiments of the current invention. Shown in FIG. 2a are the following: mounting plate (1); impact protector location feature (2); mounting plate location feature (3); drivetrain clearance hole (4); frame structure (7); bottom bracket (8); bottom bracket flange (9); bottom bracket spindle (10); mounting tab (11); impact protector (12); mounting plate fastener (13); impact protector fastener (14).

It is illustrated in FIG. 2a that a mounting plate 1 is located to a frame structure 7 via mounting plate location features 3. Mounting tabs 11 can be part of a frame structure 7. Mounting tabs 11 can provide receptacles for mounting plate fasteners 13. Mounting plate fasteners 13 attach a mounting plate 1 to a frame structure 7, and mounting plate fasteners 13 are positioned at a distance away from each other so as to provide a greater mechanical advantage to impede free movement of a mounting plate 1 in relation to a frame structure 7. A bottom bracket 8 comprises a bottom bracket spindle 10 and a bottom bracket flange 9. A bottom bracket spindle 10 can rotate inside the bottom bracket 8 in one degree of freedom. A bottom bracket 8 can be attached to a frame structure 7 via a threaded or press fit or tapered or clamped connection. A bottom bracket flange 9 positions a bottom bracket 8 in a direction substantially perpendicular to a bottom bracket spindle 10 rotation axis, and in relation to a frame structure 7. A bottom bracket spindle 10 can be in some embodiments supported by bearings which allow rotation of a bottom bracket spindle 10 that are in turn supported by a bottom bracket 8. Bearings can be supported by a bottom bracket 8 so that the bearings are substantially inside or outside the envelope of a frame structure 7. A mounting plate 1 comprises mounting plate location features 3, a drivetrain clearance hole 4, and one or more impact protector location features 2. A drivetrain clearance hole 4 allows sufficient clearance between a bottom bracket 8 and mounting plate 1 so as to reduce mechanical interaction between the bottom bracket 8 and mounting plate 1 that could damage the bottom bracket 8 during an impact. An impact protector 12 locates to a mounting plate 1 via one or more impact protector location features 2. One or more impact protector fasteners 14 can be used to fasten an impact protector 12 to a mounting plate 1. A mounting plate 1 meditates the transmission of force from an impact protector 12 to a frame structure 7. A mounting plate 1 meditates the transmission of force from an impact protector 12 to a frame structure 7 without transmitting force into or through a bottom bracket 8.

Figure 2B:
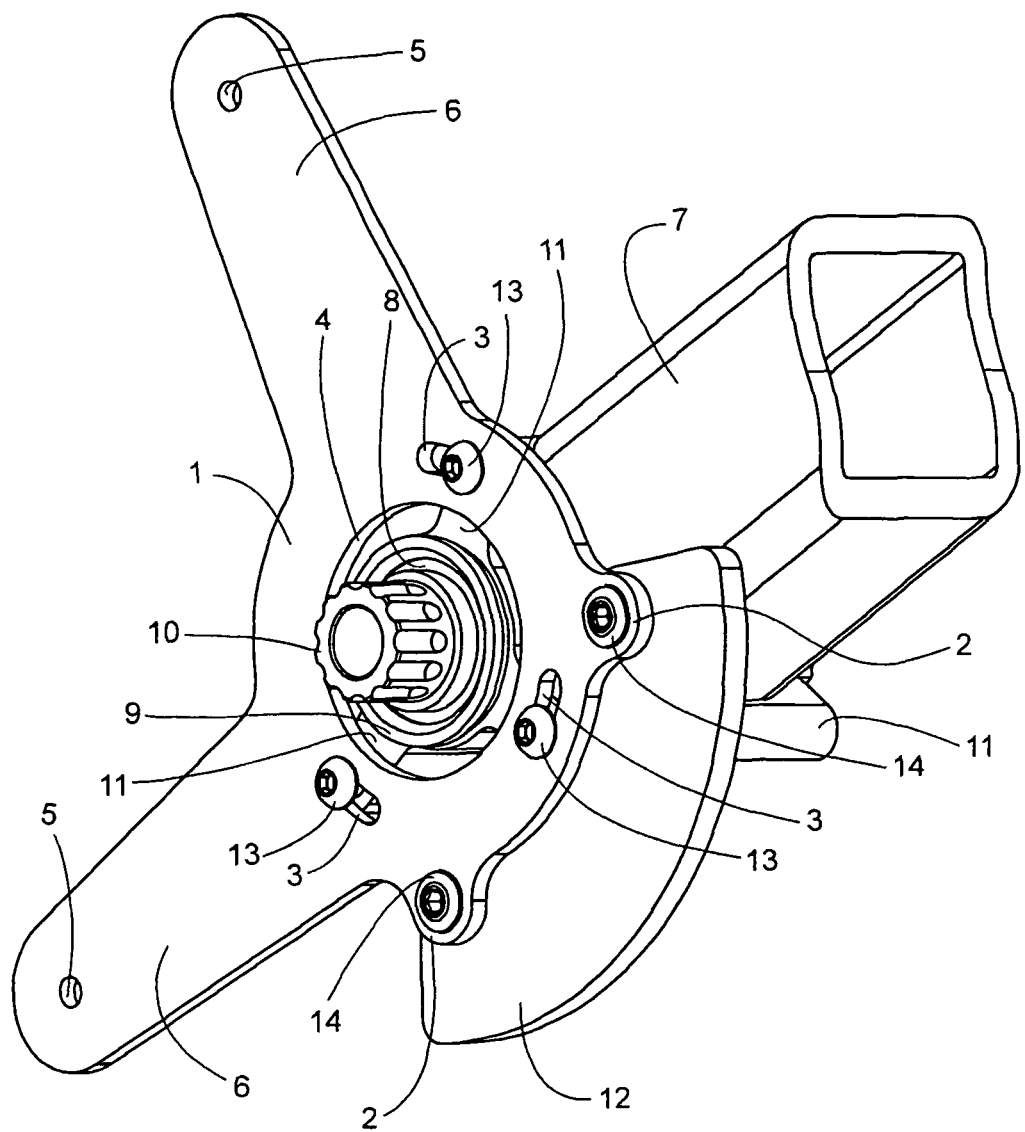
FIG. 2b shows a close up cutaway three-dimensional view example of an embodiment of the present invention as shown in FIG. 1b.

FIG. 2b shows a three-dimensional view of elements that comprise an impact protector mounting according to certain embodiments of the current invention. Shown in FIG. 2b are the following: mounting plate (1); impact protector location feature (2); mounting plate location feature (3); drivetrain clearance hole (4); chain guide part location feature (5); chain guide part mounting arm (6); frame structure (7); bottom bracket (8); bottom bracket flange (9); bottom bracket spindle (10); mounting tab (11); impact protector (12); mounting plate fastener (13); impact protector fastener (14).

It is illustrated in FIG. 2b that a mounting plate 1 is located to a frame structure 7 via mounting plate location features 3. Mounting tabs can be part of a frame structure 7. Mounting tabs 11 can provide receptacles for mounting plate fasteners 13. Mounting plate fasteners 13 attach a mounting plate 1 to a frame structure 7, and mounting plate fasteners 13 are positioned at a distance away from each other so as to provide a greater mechanical advantage to impede free movement of a mounting plate 1 in relation to a frame structure 7. A bottom bracket 8 comprises a bottom bracket spindle 10 and a bottom bracket flange 9. A bottom bracket spindle 10 can rotate in relation to a bottom bracket 8 in one degree of freedom. A bottom bracket 8 can be attached to a frame structure 7 via a threaded or press fit or tapered or clamped connection. A bottom bracket flange 9 positions a bottom bracket 8 in a direction substantially perpendicular to a bottom bracket spindle 10 rotation axis, and in relation to a frame structure 7. A bottom bracket spindle 10 can be in some embodiments supported by bearings which allow rotation of a bottom bracket spindle 10 that are in turn supported by a bottom bracket 8. Bearings can be supported by a bottom bracket 8 so that the bearings are substantially inside or outside the envelope of a frame structure 7. A mounting plate 1 comprises mounting plate location features 3, a drivetrain clearance hole 4, and one or more impact protector location features 2. A drivetrain clearance hole 4 allows sufficient clearance between a bottom bracket 8 and mounting plate 1 so as to reduce mechanical interaction between a bottom bracket 8 and mounting plate 1 that could damage a bottom bracket 8 during an impact. An impact protector 12 locates to a mounting plate 1 via one or more impact protector location features 2. One or more impact protector fasteners 14 can be used to fasten an impact protector 12 to a mounting plate 1. A mounting plate 1 meditates the transmission of force from an impact protector 12 to a frame structure 7. A mounting plate 1 meditates the transmission of force from an impact protector 12 to a frame structure 7 without transmitting force into or through a bottom bracket 8. An impact protector mounting as shown in FIG. 2b can be designed to share mounting locations with other components, or act as a mounting component for additional components such as chain guide sliders, rollers, idlers, or guides. Chain guide part locating features 5 are illustrated in FIG. 2b, and are supported by chainguide part mounting arms 6.

Figure 3A:
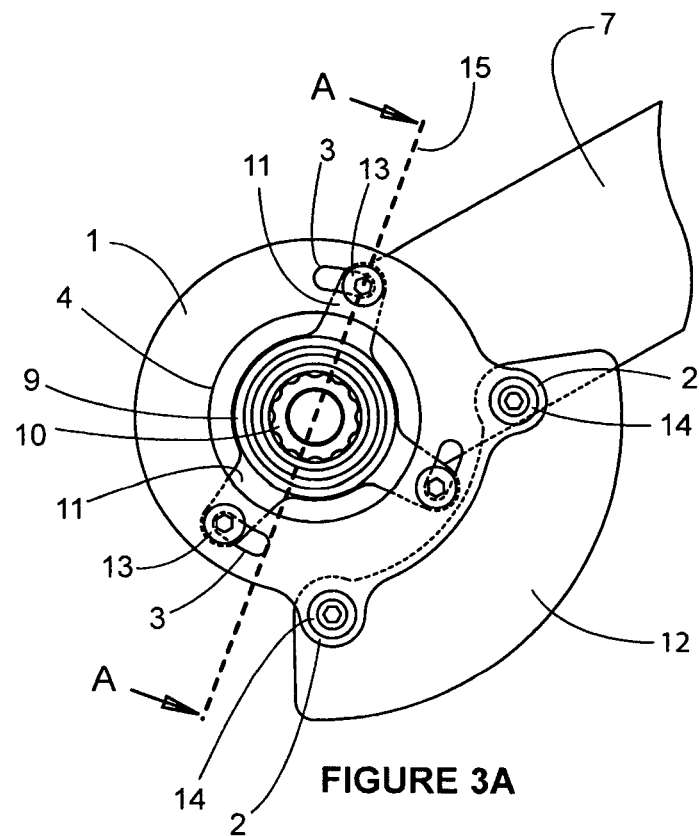
FIG. 3a illustrates a side view of an embodiment of the present invention and depicts a cutaway section view orientation direction of FIG. 3b.

FIG. 3a shows a two-dimensional view of elements that comprise an impact protector mounting according to certain embodiments of the current invention. Shown in FIG. 3a are the following: mounting plate (1); impact protector location feature (2); mounting plate location feature (3); drivetrain clearance hole (4); frame structure (7); bottom bracket (8); bottom bracket flange (9); bottom bracket spindle (10); mounting tab (11); impact protector (12); mounting plate fastener (13); impact protector fastener (14); section line A-A (15).

It is illustrated in FIG. 3a that a mounting plate 1 is located to a frame structure 7 via mounting plate location features 3. Mounting tabs 11 can be part of a frame structure 7. Mounting tabs 11 can provide receptacles for mounting plate fasteners 13. Mounting plate fasteners 13 attach a mounting plate 1 to a frame structure 7, and mounting plate fasteners 13 are positioned at a distance away from each other so as to provide a greater mechanical advantage to impede free movement of a mounting plate 1 in relation to a frame structure 7. A bottom bracket 8 comprises a bottom bracket spindle 10 and a bottom bracket flange 9. A bottom bracket spindle 10 can rotate inside the bottom bracket 8 in one degree of freedom. A bottom bracket 8 can be attached to a frame structure 7 via a threaded or press fit or tapered or clamped connection. A bottom bracket flange 9 positions a bottom bracket 8 in a direction substantially perpendicular to a bottom bracket spindle 10 rotation axis, and in relation to a frame structure 7. A bottom bracket spindle 10 can be in some embodiments supported by bearings which allow rotation of a bottom bracket spindle 10 that are in turn supported by a bottom bracket 8. Bearings can be supported by a bottom bracket 8 so that the bearings are substantially inside or outside the envelope of a frame structure 7. A mounting plate 1 comprises mounting plate location features 3, a drivetrain clearance hole 4, and one or more impact protector location features 2. A drivetrain clearance hole 4 allows sufficient clearance between a bottom bracket 8 and mounting plate 1 so as to reduce mechanical interaction between the bottom bracket 8 and mounting plate 1 that could damage the bottom bracket 8 during an impact. An impact protector 12 locates to a mounting plate 1 via one or more impact protector location features 2. One or more impact protector fasteners 14 can be used to fasten an impact protector 12 to a mounting plate 1. A mounting plate 1 meditates the transmission of force from an impact protector 12 to a frame structure 7. A mounting plate 1 meditates the transmission of force from an impact protector 12 to a frame structure 7 without transmitting force into or through a bottom bracket 8. Section line A-A 15 is used to create a sectional view, section A-A illustrated in FIG. 3b.

Figure 3B:
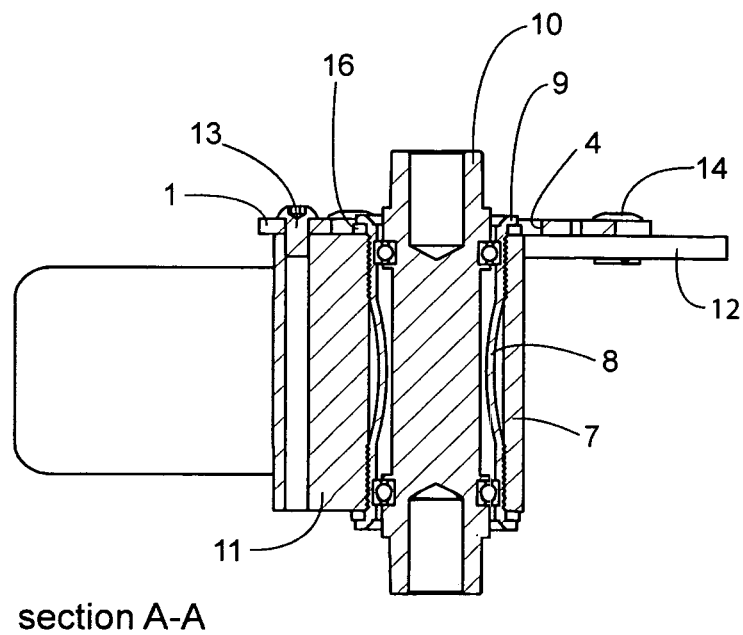
FIG. 3b illustrates a sectional view of an embodiment of the current invention.

FIG. 3b shows a two-dimensional sectional view, section A-A of elements that comprise an impact protector mounting according to certain embodiments of the current invention. Shown in FIG. 3b are the following: mounting plate (1); impact protector location feature (2); mounting plate location feature (3); drivetrain clearance hole (4); frame structure (7); bottom bracket (8); bottom bracket flange (9); bottom bracket spindle (10); mounting tab (11); impact protector (12); mounting plate fastener (13); impact protector fastener (14); bottom bracket spacer (16).

FIG. 3b illustrates a sectional view, section A-A, as defined by section line A-A 15 shown in FIG. 3a. FIG. 3b is used to show clearly that a mounting plate 1 is separated from mechanical contact with a bottom bracket 8. It is illustrated in FIG. 3b that a mounting plate 1 is located to a frame structure 7. Mounting tabs 11 can be part of a frame structure 7. Mounting tabs 11 can provide receptacles for mounting plate fasteners 13. Mounting plate fasteners 13 attach a mounting plate 1 to a frame structure 7, and mounting plate fasteners 13 are positioned at a distance away from each other so as to provide a greater mechanical advantage to impede free movement of a mounting plate 1 in relation to a frame structure 7. A bottom bracket 8 comprises a bottom bracket spindle 10 and a bottom bracket flange 9. A bottom bracket spindle 10 can rotate inside the bottom bracket 8 in one degree of freedom. A bottom bracket 8 can be attached to a frame structure 7 via a threaded or press fit or tapered or clamped connection. A bottom bracket flange 9 positions a bottom bracket 8 in a direction substantially perpendicular to a bottom bracket spindle 10 rotation axis, and in relation to a frame structure 7. A bottom bracket spacer 16 is positioned between a bottom bracket flange 9 and frame structure 7. A bottom bracket spacer can be used to act as a washer for spacing and ease of assembly purposes. A bottom bracket spindle 10 can be in some embodiments supported by bearings which allow rotation of a bottom bracket spindle 10 that are in turn supported by a bottom bracket 8. Bearings can be supported by a bottom bracket 8 so that the bearings are substantially inside or outside the envelope of a frame structure 7. A drivetrain clearance hole 4 allows sufficient clearance between a bottom bracket 8 and mounting plate 1 so as to reduce mechanical interaction between the bottom bracket 8 and mounting plate 1 that could damage the bottom bracket 8 during an impact. An impact protector 12 locates to a mounting plate 1. One or more impact protector fasteners 14 can be used to fasten an impact protector 12 to a mounting plate 1. A mounting plate 1 meditates the transmission of force from an impact protector 12 to a frame structure 7. A mounting plate 1 meditates the transmission of force from an impact protector 12 to a frame structure 7 without transmitting force into or through a bottom bracket 8.

Mounting and attachment variations of the current invention are discussed. Some embodiments of the invention can be designed to share mounting locations with other components. Some of the many applications where shared mounting of an impact protector and an existing component could be useful would be bicycles and motorcycles. Some embodiments of the invention can be designed to use dedicated mounting components. Some of the many applications where embodiments using dedicated mounting components could be useful are bicycle drivetrains, motorcycle drivetrains, and electric bike drivetrains. Impact protector mountings of the invention can be facilitated by many possible mechanical devices. The simplest and most economical mounting arrangement will typically be but is not limited to a bolted connection. A bolted mounting arrangement could consist of bolts or fasteners that attach an impact protector to a mounting plate so that the mounting axes are in a parallel or perpendicular plane to the impact force. A bolted mounting arrangement could consist of bolts or fasteners that attach a mounting plate to a frame structure so that the mounting axes are in a parallel or perpendicular plane to the impact force. A bolted mounting arrangement could likewise consist of bolts or fasteners that attach an impact protector to a mounting plate so that the mounting axes are not in a parallel or perpendicular plane to the impact force. A bolted mounting arrangement could likewise consist of bolts or fasteners that attach a mounting plate to a frame structure so that the mounting axes are not in a parallel or perpendicular plane to the impact force. Any combination of other attachments and fasteners could be used to facilitate mounting. Additionally, bosses or embossed mounting locations could allow for a mechanical interface between an impact protector and a mounting plate. Other fastener augmenting mechanical interfaces could be in the form of circular or non-circular holes with complementing mechanical features on both a mounting plate and impact protector. Additionally, bosses or embossed mounting locations could allow for a mechanical interface between a mounting plate and an frame structure. Other fastener augmenting mechanical interfaces could be in the form of circular or non-circular holes with complementing mechanical features on both a mounting plate and frame structure.

An impact protector mounting of the current invention in certain embodiments could comprise a bolted connection, multiple bolts, one bolt, two bolts, three bolts, four bolts, five bolts, six bolts, seven bolts, eight bolts, chainring bolts, chainring nuts, T-nuts, a bolt and nut combination, bolt and nut combinations, screws, threads, a threaded connection, rivets, pop-rivets, aircraft rivets, pins, split pins, alignment pins, alignment studs, studs, bushings, splines, keys, keyways, a machined spline, wave splines, a mounting bracket, an intermediate mounting bracket, a mounting support, an impact protector support, a mounting receptacle, a boss, an embossed interface, a non-circular mounting hole, a drivetrain clearance hole, a drivetrain clearance area, a bottom bracket clearance area, a bottom bracket clearance slot, a drivetrain clearance slot, a bottom bracket clearance feature, a drivetrain clearance feature, a rigid mounting, a flexible mounting, rubber mounting, a bicycle crank arm, chainring tabs, a chainring, a chainwheel, a bicycle chainguide, a bicycle chain retention system, a chainguide back plate, a chainguide boomerang, a bicycle chainguide mounting plate, ISCG mounting tabs, ISCG05 mounting tabs, a disc brake rotor, a disc brake rotor mount, a brake drum, a mounting plate, an engine crankcase, an electric motor, a transmission case, an axle.

An impact protector mounting of the invention in certain embodiments is useful to protect, for example, a sprocket, a chainwheel, a bottom bracket, an axle, a structural component, a bicycle frame, a disc brake rotor, a disc brake caliper, a drum brake, a motorcycle frame, an ATV frame, an off-road vehicle frame, an engine, a motor, a transmission, a gearbox, a sequential gearbox, a flywheel, a lawnmower deck, a lawnmower, a snowblower, a plow frame, a plow, garden equipment, brush clearing equipment, construction equipment, a cart, an electronics enclosure, a boat keel, a boat hull, a watercraft hull.

An impact protector mounting of the current invention is manufactured, for example, by or from CNC machining, machining, turning, injection molding, machining of injection molded parts, CNC machining of injection molded parts, drilling, tapping, drilling injection molded parts, tapping injection molded parts, bonding, gluing, friction welding, welding, TIG welding, MIG welding, arc welding, plasma welding, laser welding, friction stir welding, resistance welding, stamping, forging, casting, cutting, waterjet cutting, laser cutting, sawing, torch cutting, flame cutting, annealing, heat treating, plastic, metal, aluminum, steel, stainless steel, titanium, ceramic, metal matrix, composite, fibrous composite, carbon fiber, fiberglass, kevlar, blended fibers, elastomers, elastomer, TPR, TPE, polyurethane, foam, damping foam, urethane, elastomer and metal composites, elastomer and plastic composites, elastomer and fibrous composite composites, springs, coil spring, torsion spring, a hard outer ring, an anti friction impact beam The present invention is not to be limited in scope by the specific embodiments described herein, which are intended as single illustrations of individual aspects of the invention, and functionally equivalents and components are within the scope of the invention. Indeed, various modifications of the invention, in addition to those shown and described herein, will become apparent to those skilled in the art from the foregoing description. Such modifications are intended to fall within the scope of the appended claims. Throughout this application the singular includes the plural and the plural includes the singular, unless indicated otherwise. All cited publications, patents, and patent applications are herein incorporated by reference in their entirety.

What is claimed is:

1. An impact protector mounting for a bicycle having a frame with a bottom bracket and a spindle having a rotational axis and pivotally securing a front sprocket to the frame, the impact protector comprising:
   a mounting plate having a first side surface facing said bicycle frame and a second side surface facing said front sprocket; and
   an impact protector;
   wherein said mounting plate is mounted directly to a bicycle frame structure by a threaded mounting plate fastener extending through the mounting plate and into the bicycle frame structure, and wherein said mounting plate does not directly contact a drivetrain component of said bicycle;
   wherein said impact protector is mounted to said first side surface of said mounting plate through a connection selected from the group consisting of a bolted connection, screws, threads, rivets, pins, studs, bushing, splines, keys, chainring nuts, T-nuts and a bolt and nut connection, and
   wherein said impact protector is substantially planar and located adjacent to and parallel to said front sprocket in a direction of said rotational axis and entirely inboard and not overlapping a plane of said adjacent front sprocket of said bicycle.

2. The impact protector mounting of claim 1, wherein said mounting plate comprises multiple mounting plate mounting apertures for mounting said mounting plate to said frame and wherein said impact protector extends beyond the sprocket.

3. The impact protector mounting of claim 1, wherein said impact protector and said mounting plate are of a structural rigidity so as to mediate the transmission of force from impacts upon said impact protector to said frame structure without transmitting force to said drivetrain component.

4. An impact protector mounting for a bicycle having a frame with a bottom bracket and a spindle having a rotational axis and pivotally securing a front sprocket to the frame, the impact protector comprising:

a mounting plate having a first side surface facing said bicycle frame and a second side surface facing said front sprocket; and an impact protector;

wherein said mounting plate is mounted to a bicycle frame structure by a threaded mounting plate fastener extending through said mounting plate and into said bicycle frame structure and wherein said mounting plate does not directly contact a drivetrain component of said bicycle; and wherein said impact protector is mounted said first side surface of said mounting plate, wherein said impact protector is capable of protecting said sprocket, bottom bracket, or drivetrain component, and wherein said impact protector is mounted to said mounting plate through a connection selected from the group consisting of a bolted connection, screws, threads, rivets, pins, studs, bushings, splines, keys, chainring nuts, T-nuts, and a bolt and nut combination and wherein said impact protector is substantially planar and located adjacent to and parallel to said front sprocket in a direction of said rotational axis and entirely inboard and not overlapping a plane of said adjacent front sprocket of said bicycle.

5. The impact protector mounting of claim 4, wherein said mounting plate comprises multiple mounting plate mounting apertures for mounting said mounting plate to said frame.

6. The impact protector mounting of claim 4, wherein said impact protector and said mounting plate are of a structural rigidity so as to mediate the transmission of force from impacts upon said impact protector to said frame structure without transmitting force to said drivetrain component.

7. The impact protector mounting of claim 4, wherein a planar surface of said substantially planar impact protector faces an inner surface of said sprocket of said bicycle with said planar surface located inboard of said sprocket and extending beyond an outer edge of said sprocket in the direction of the ground.

* * * * *